US012767240B2

(12) United States Patent
Jeong

(10) Patent No.: US 12,767,240 B2
(45) Date of Patent: Oct. 20, 2026

(54) ELECTRIC VEHICLE BODY STRUCTURE

(71) Applicants: Hyundai Motor Company, Seoul (KR); Kia Corporation, Seoul (KR)

(72) Inventor: Seung Min Jeong, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 287 days.

(21) Appl. No.: 18/610,633

(22) Filed: Mar. 20, 2024

(65) Prior Publication Data

US 2025/0162658 A1 May 22, 2025

(30) Foreign Application Priority Data

Nov. 20, 2023 (KR) ........................ 10-2023-0161384

(51) Int. Cl.
*B62D 25/20* (2006.01)
*B62D 25/02* (2006.01)

(52) U.S. Cl.
CPC ....... *B62D 25/2018* (2013.01); *B62D 25/025* (2013.01)

(58) Field of Classification Search
None
See application file for complete search history.

(56) References Cited

U.S. PATENT DOCUMENTS 9,045,030 B2 6/2015 Rawlinson et al.
10,676,135 B2 * 6/2020 Jeong ..................... B62D 25/02
10,780,923 B2 * 9/2020 Caliskan ................ B60N 2/015
10,899,213 B2 * 1/2021 Baccouche .............. B60K 1/04
12,448,054 B2 * 10/2025 Carl .................... H01M 50/249
2013/0049405 A1 * 2/2013 Kurogi ............... B62D 25/2036 29/897.2
2018/0050607 A1 * 2/2018 Matecki .................. B60L 50/64
2018/0186227 A1 * 7/2018 Stephens .................. B60K 1/04
2019/0359260 A1 11/2019 Tsuyuzaki et al.
2024/0217583 A1 * 7/2024 Jeong ...................... B60L 50/66

FOREIGN PATENT DOCUMENTS

| | | | | | |
|---|---|---|---|---|---|
| CN | 112310541 | A | * | 2/2021 | ............... B60K 1/04 |
| CN | 113602364 | B | | 10/2022 | |
| DE | 102023119319 | A1 | * | 7/2024 | ............. B60L 50/66 |
| JP | 5372128 | B2 | | 12/2013 | |
| JP | 6897539 | B2 | | 6/2021 | |
| JP | 2021160507 | A | | 10/2021 | |
| KR | 20220126132 | A | | 9/2022 | |
| KR | 20230088579 | A | | 6/2023 | |

* cited by examiner

*Primary Examiner* — Aaron L Lembo
(74) *Attorney, Agent, or Firm* — Slater Matsil, LLP

(57) ABSTRACT

An embodiment body structure of an electric vehicle includes a floor panel covering an upper side of a battery accommodation space, an integrated battery front cross member disposed on a front lower side of the floor panel and covering a front of the battery accommodation space, a dash cross member coupled to the floor panel and the integrated battery front cross member, a front side member disposed at a front side of the dash cross member, and a front side rear lower member connecting a rear of the front side member to the dash cross member.

20 Claims, 12 Drawing Sheets

ELECTRIC VEHICLE BODY STRUCTURE

CROSS-REFERENCE TO RELATED APPLICATIONS

This application claims the benefit of Korean Patent Application No. 10-2023-0161384, filed on Nov. 20, 2023, which application is hereby incorporated herein by reference.

TECHNICAL FIELD

The present disclosure relates to an electric vehicle body structure.

BACKGROUND

An electric vehicle is configured to drive by driving a motor with electricity provided by a battery mounted on the vehicle.

Accordingly, a cruising distance of the vehicle is greatly influenced by an energy storage capacity of the battery mounted on the vehicle.

Both mounting a battery on a vehicle so that a vehicle may store as much electric energy as possible and securing various crash response performances required by a vehicle are major objectives in development of an electric vehicle.

Recently, in order to increase an amount of battery cells mounted on a vehicle, a vehicle structure with a cell to body (CTB) method in which a battery cell is mounted directly on a vehicle body has been being developed.

The details described as the background technology of embodiments of the present disclosure are only intended to improve an understanding of the background of embodiments of the present disclosure. It should not be accepted that it is acknowledged that it corresponds to the prior art already publicly known.

SUMMARY

Various aspects of embodiments of the present disclosure are directed to providing a method of cell to body (CTB) in which battery cells are directly mounted on a vehicle body and a body structure for an electric vehicle so that battery cells are effectively protected by providing a robust impact support structure against a front and rear impact force of a vehicle body.

According to one embodiment of the present disclosure, there is provided an electric vehicle body structure comprising a floor panel installed to cover an upper side of a battery accommodation space, an integrated battery front cross member provided on a front lower side of the floor panel and covering a front of the battery accommodation space, a dash cross member coupled to the floor panel and the integrated battery front cross member, a front side member provided in a front of the dash cross member, and a front side rear lower member connecting a rear of the frontside member to the dash cross member.

According to an embodiment of the present disclosure, the electric vehicle body structure may further include an integrated battery rear cross member provided on a rear lower side of the floor panel and covering a rear of a battery accommodation space, a side sill coupled to both ends of the integrated battery front cross member and the integrated battery rear cross member and covering a side portion of a battery accommodation space, a battery lower module coupled to lower sides of the integrated battery front cross member, the integrated battery rear cross member, and the side sill and covering a lower portion of a battery accommodation space.

In an embodiment of the present disclosure, the battery lower module may include a lower module outer front cross member coupled to a lower side of the integrated battery front cross member, a lower module outer rear cross member coupled to a lower side of the integrated battery rear cross member, a lower module outer side member coupled to a lower side of the side sill, and a lower plate coupled to a lower side of the lower module outer front cross member, the lower module outer rear cross member, and the lower module outer side member and covering a lower portion of the battery accommodation space.

In an embodiment of the present disclosure, the dash cross member may be coupled to an upper side of the floor panel and a front surface of the integrated battery front cross member.

In an embodiment of the present disclosure, the front side rear lower member may be coupled by vertically surrounding a front surface of the dash cross member and may be coupled to a front surface of the integrated battery front cross member.

In an embodiment of the present disclosure, the electric vehicle body structure may further include an extension side member connecting a rear of the front side member to an A-pillar including a lower end coupled to the side sill by being coupled with the front side rear lower member.

In an embodiment of the present disclosure, the electric vehicle body structure may further include a dash cross extension member installed in order to connect the dash cross member to the side sill and the A-pillar.

In an embodiment of the present disclosure, the floor panel may be provided with a floor front cross member disposed to protrude upward in order to connect both side sills, and a dash floor connection member may also be provided to connect and support an interval of the dash cross member and the floor front cross member along a front-back direction of a vehicle body.

In an embodiment of the present disclosure, a corner reinforcement member coupled obliquely to the integrated battery rear cross member and the side sill may be provided between the integrated battery rear cross member and the side sill.

In an embodiment of the present disclosure, a coupling flange protruding toward the battery accommodation space and coupled to a lower side of the floor panel may be integrally provided on an upper side of the corner reinforcement member.

In an embodiment of the present disclosure, the battery lower module may include a lower module outer corner member, the lower module outer corner member coupled obliquely to the lower module outer rear cross member and the lower module outer side member, on a lower side of the corner reinforcement member, also may be provided between the lower module outer rear cross member and the lower module outer side member.

The lower module outer front cross member, the lower module outer rear cross member, the lower module outer side member, and the lower module outer corner member, with a gasket forming a closed curve in between, may be configured to seal up a battery accommodation space by being coupled with the integrated battery front cross member, the integrated battery rear cross member, the side sill, and the corner reinforcement member.

A rear side member is coupled to a rear end of the side sill. A front end of the rear side member may be formed into a shape surrounding an upper side surface, a lower side surface, and a rear end of the side sill.

The electric vehicle body structure may further include a side sill lower rib forming an opened groove downward together with the lower module outer side member in the side sill, a rear side partition wall portion extending from an upper side to a lower side in order to surround a rear end of the side sill in the rear side member, and a partition wall flange portion surrounding a lower side of the side sill by being inserted into a groove formed by the side sill lower rib and the lower module outer side member at a lower end of the rear side partition wall portion in the rear side member.

The rear side member may be coupled to support a rear of the corner reinforcement member with the side sill.

The floor panel is provided with a floor rear cross member disposed to protrude upward in order to connect both side sills, the rear side member may be coupled to the floor rear cross member, and a rear subframe also may be mounted on a lower side of the rear side member.

The electric vehicle body structure may include the floor panel, wherein a cross-sectional shape with a plurality of closed cross-sections is formed by extending along a transverse direction of a vehicle body, and the integrated battery front cross member and the integrated battery rear cross member integrally formed with the floor panel into a cross section protruding to a lower side of the floor panel.

A plurality of the floor panels are disposed in a front-to-back direction in order to planarly surround an upper side of the battery accommodation space. The floor panel provided with the integrated battery front cross member is also integrally formed with a floor front cross member protruding upward in order to connect both of the side sills. The floor panel provided with the integrated battery rear cross member may also be integrally formed with a floor rear cross member protruding upward in order to connect both of the side sills.

A front subframe is mounted on a lower side of the front side member. A rear end of the front subframe may also be supported by a front subframe mounting bracket on a lower side of the dash cross member.

DETAILED DESCRIPTION OF ILLUSTRATIVE EMBODIMENTS

Hereinafter, embodiments disclosed in the present specification will be described in detail with reference to the accompanying drawings. However, regardless of a drawing symbol, identical or similar components will be given the same reference number and, regarding this, redundant explanations will be omitted.

In the following description, the suffixes "module" and "part" used for components are given or used interchangeably only for an ease of writing a specification, therefore they do not always have distinct meanings or roles by themselves.

In describing embodiments disclosed in the present specification, if it is determined that detailed descriptions of related known technologies may obscure a gist of the embodiments disclosed in the present specification, the detailed descriptions will be omitted.

In addition, the accompanying drawings are only intended to facilitate an understanding of embodiments disclosed in the present specification. The technical ideas disclosed in the present specification are also not limited by the accompanying drawings, and the embodiments should also be understood to include all changes, equivalents, and substitutes included in the spirit and technical scope of the present disclosure.

A term containing an ordinal number, such as first, second, etc., may be used to describe various components. However, the above components are not limited by the above terms. The above terms are used only for the purpose of distinguishing one component from another.

When one component is referred to as being "connected" or "coupled" to another, it should be understood that it may be directly connected or coupled to another component; however, it also should be understood that other components may exist in between. In contrast, only when one component is referred to as being "directly connected" or "directly coupled" to another, it should be understood that there are not other components in between.

Unless a singular expression is clearly expressed differently in context, singular expressions include plural expressions.

In the present specification, a term such as "comprise" or "have" is intended to specify the presence of features, numbers, steps, operations, components, parts, or combinations thereof described in the present specification; therefore, it should be understood that this does not exclude in advance a possibility of the existence or addition of one or more other features, numbers, steps, operations, components, parts, or combinations thereof.

Figure 1:
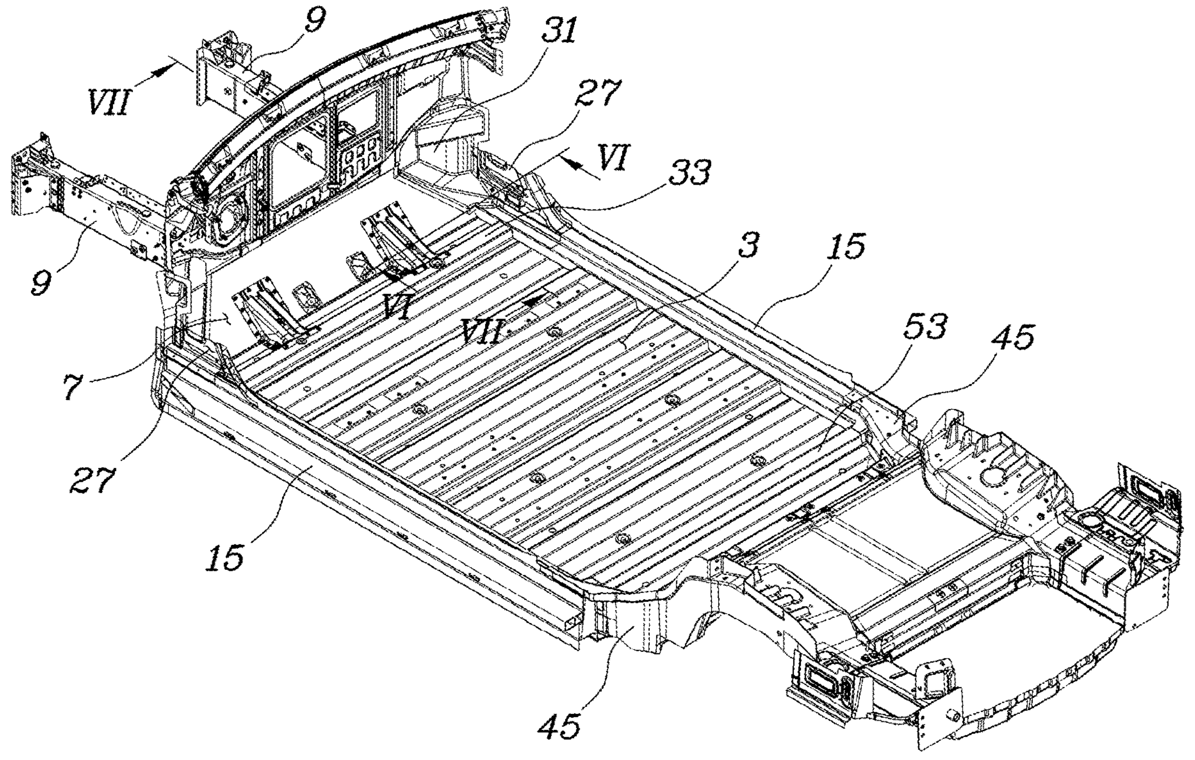
FIG. 1 is a diagram showing a structure of an electric vehicle body according to embodiments of the present disclosure.
Figure 2:
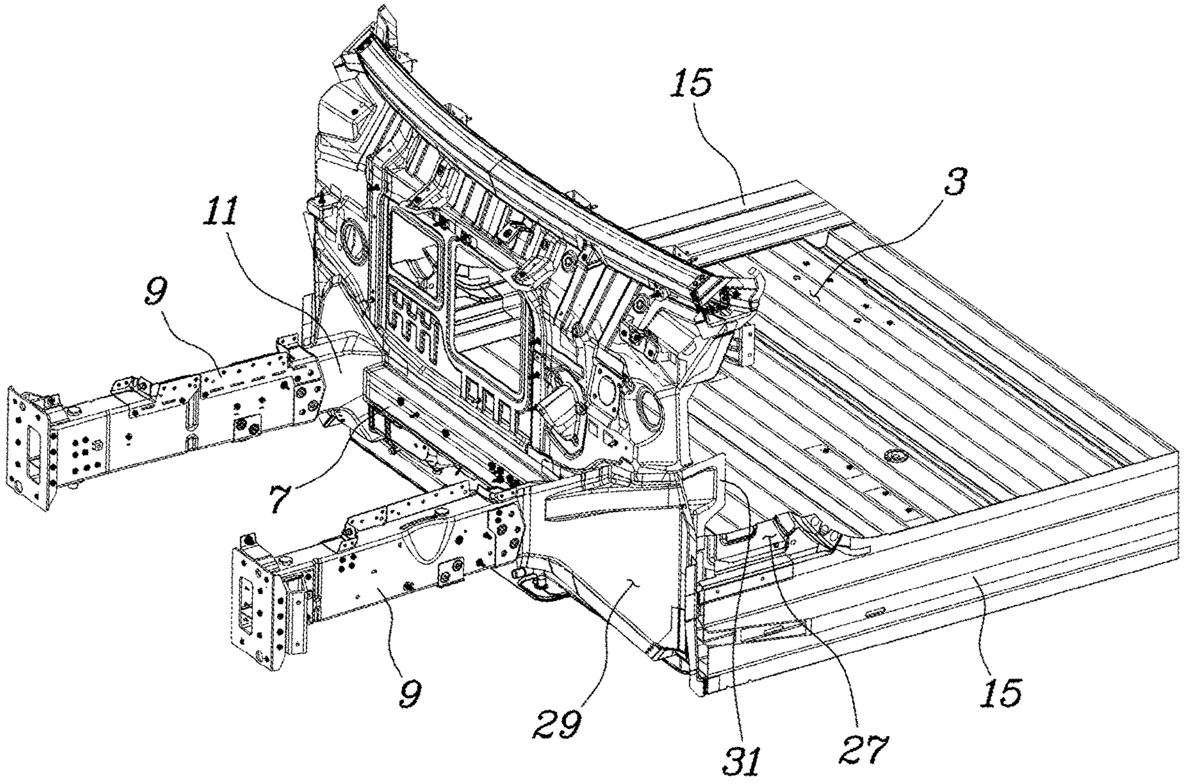
FIG. 2 is a diagram showing the vehicle body of FIG. 1 observed from a front.
Figure 3:
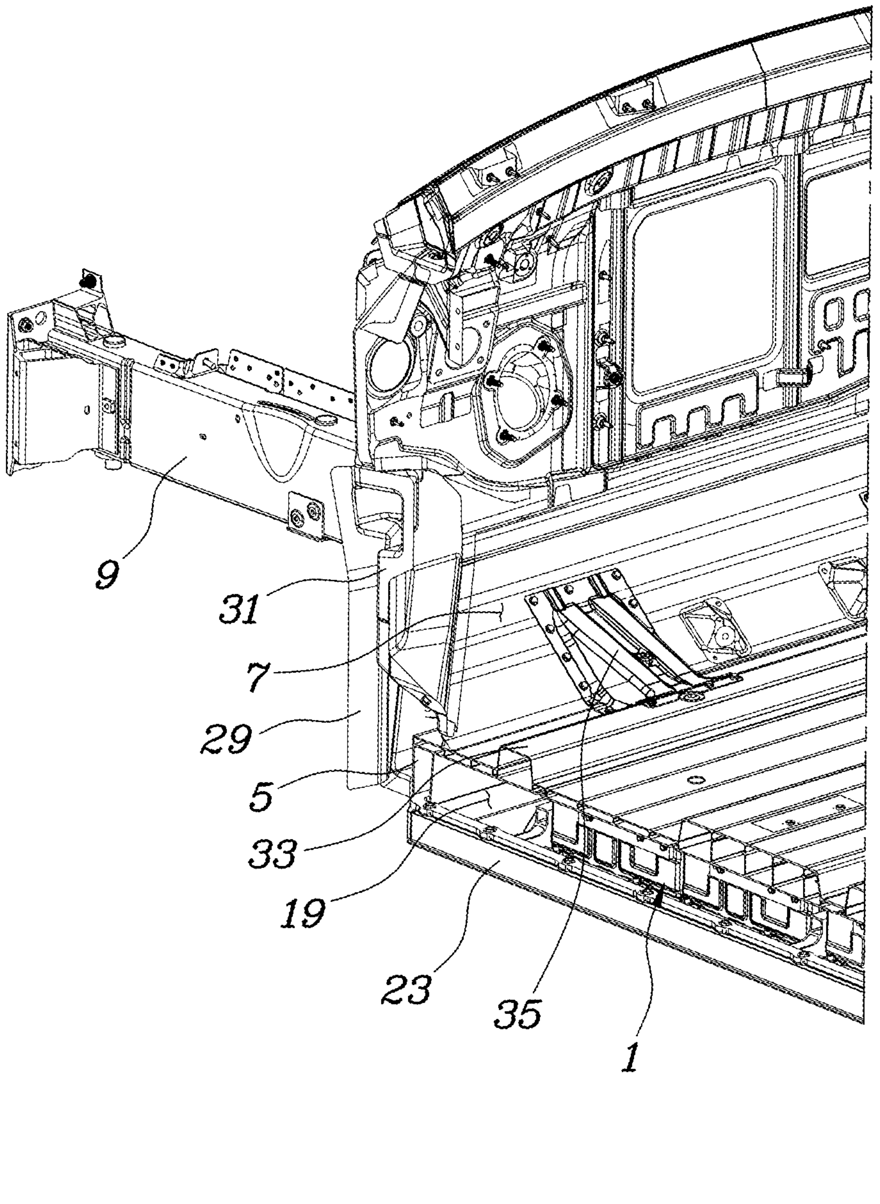
FIG. 3 is a detailed diagram with a side sill removed from the vehicle body of FIG. 1.
Figure 4:
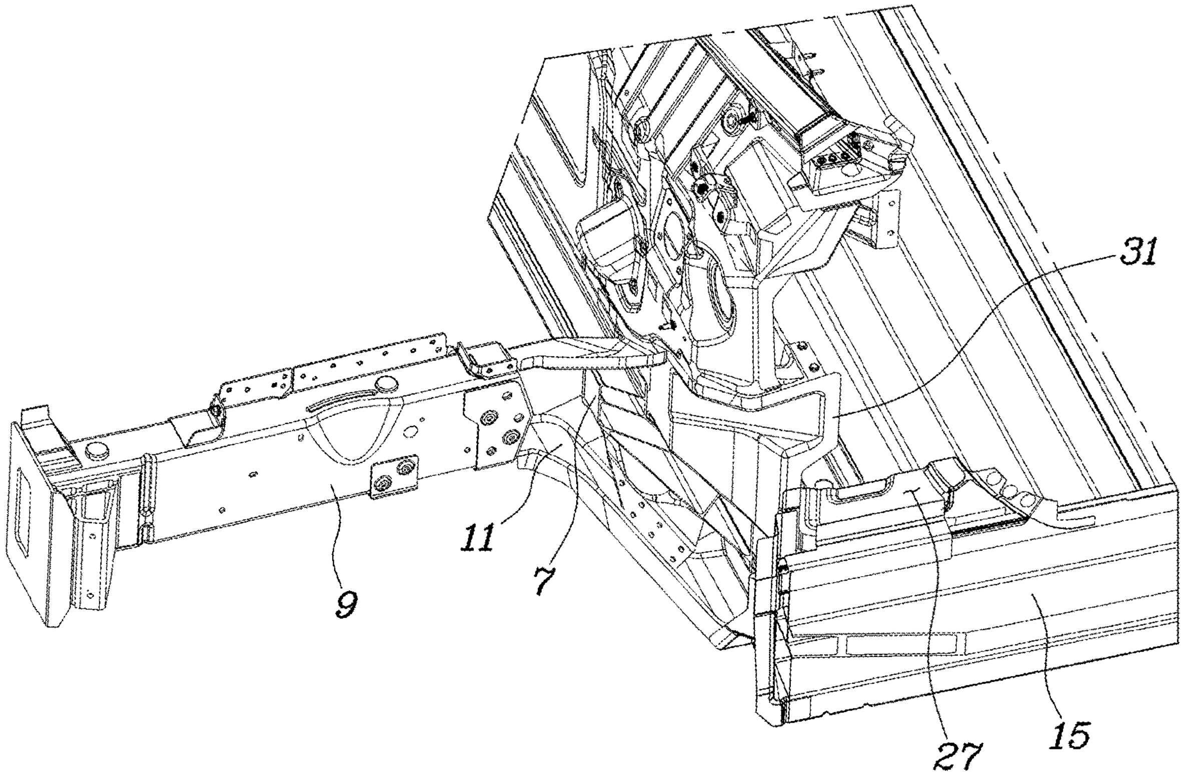
FIG. 4 is a detailed diagram with an extension side member removed from FIG. 2.
Figure 5:
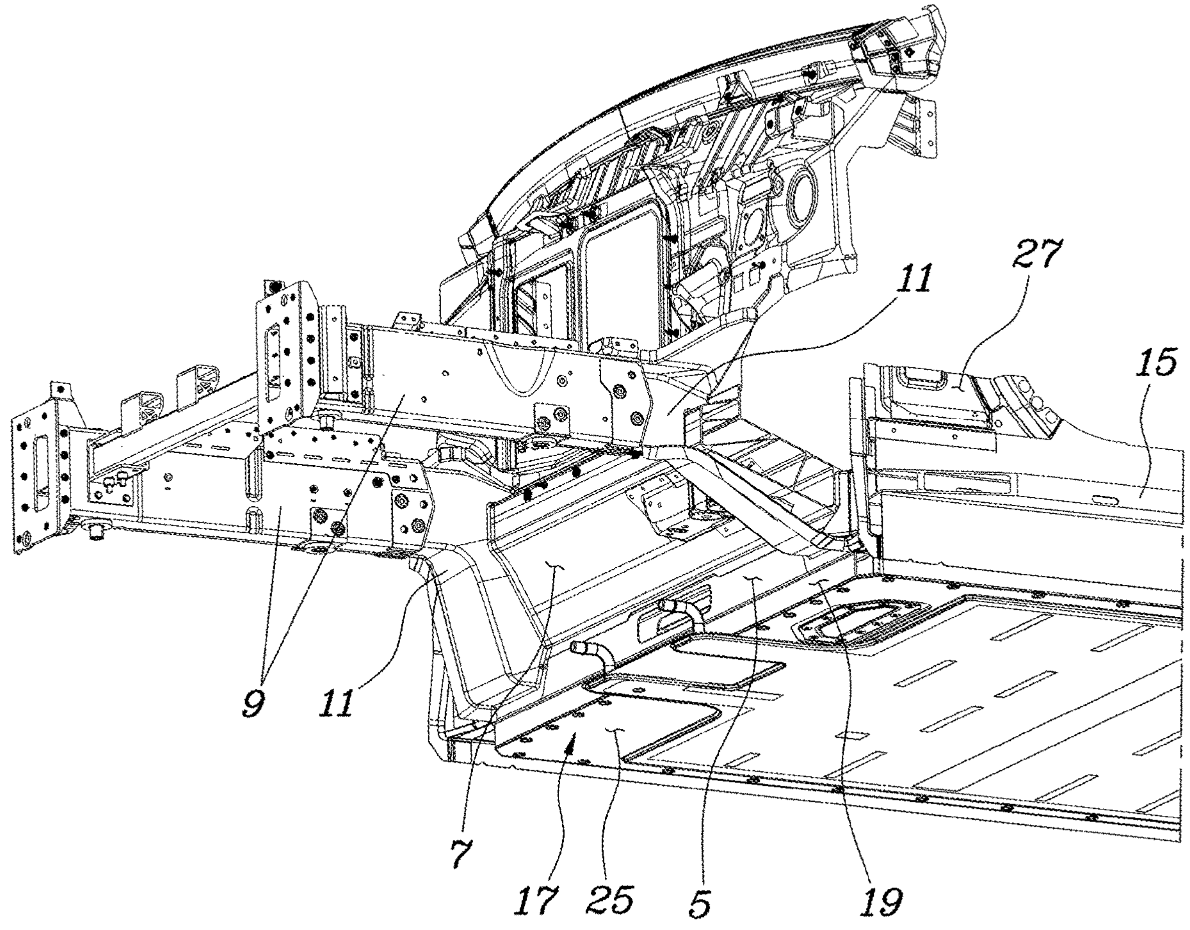
FIG. 5 is a diagram observed from a lower side with an extension side member and a dash cross extension member removed from FIG. 2.
Figure 6:
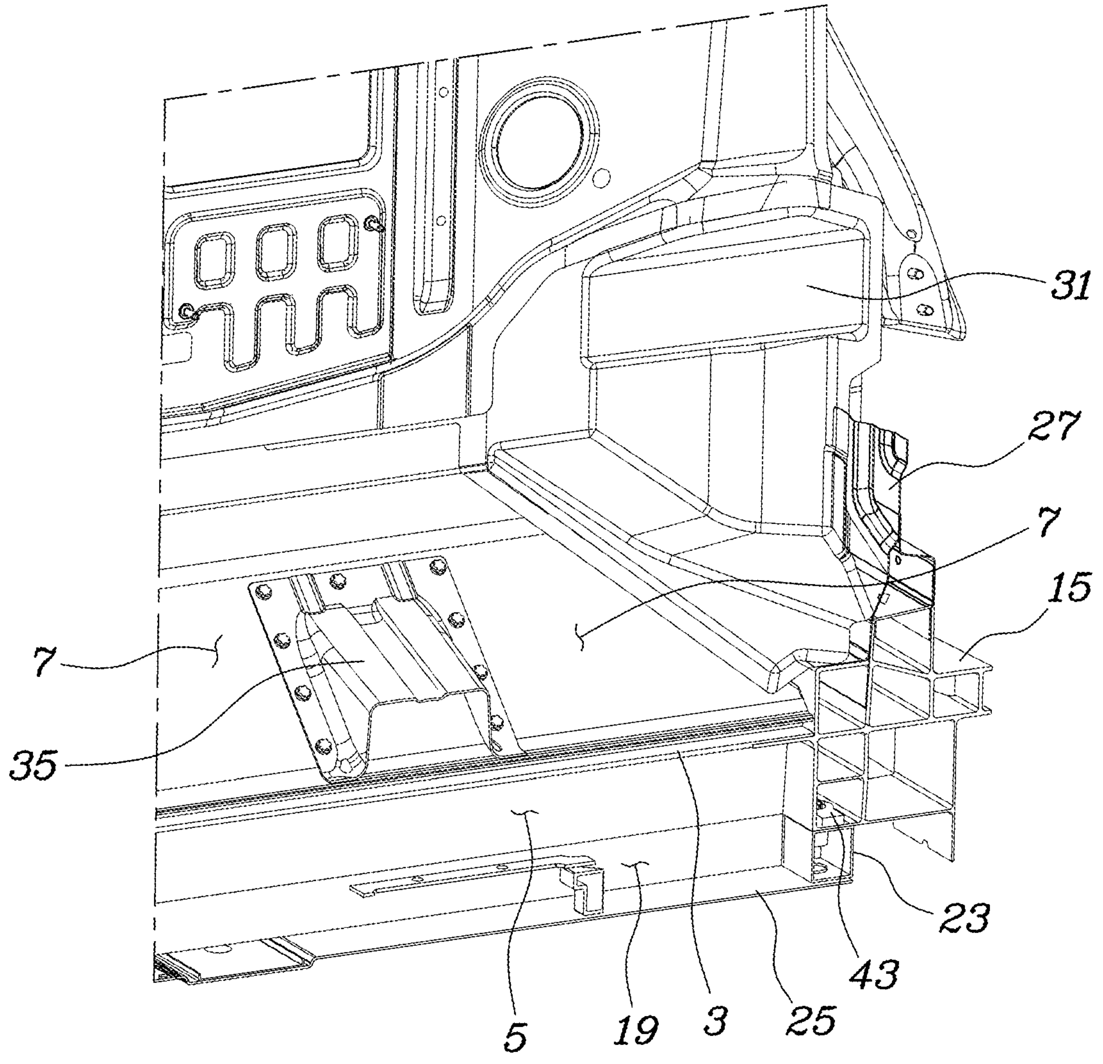
FIG. 6 is a cross-sectional diagram taken along line VI-VI in FIG. 1.
Figure 7:
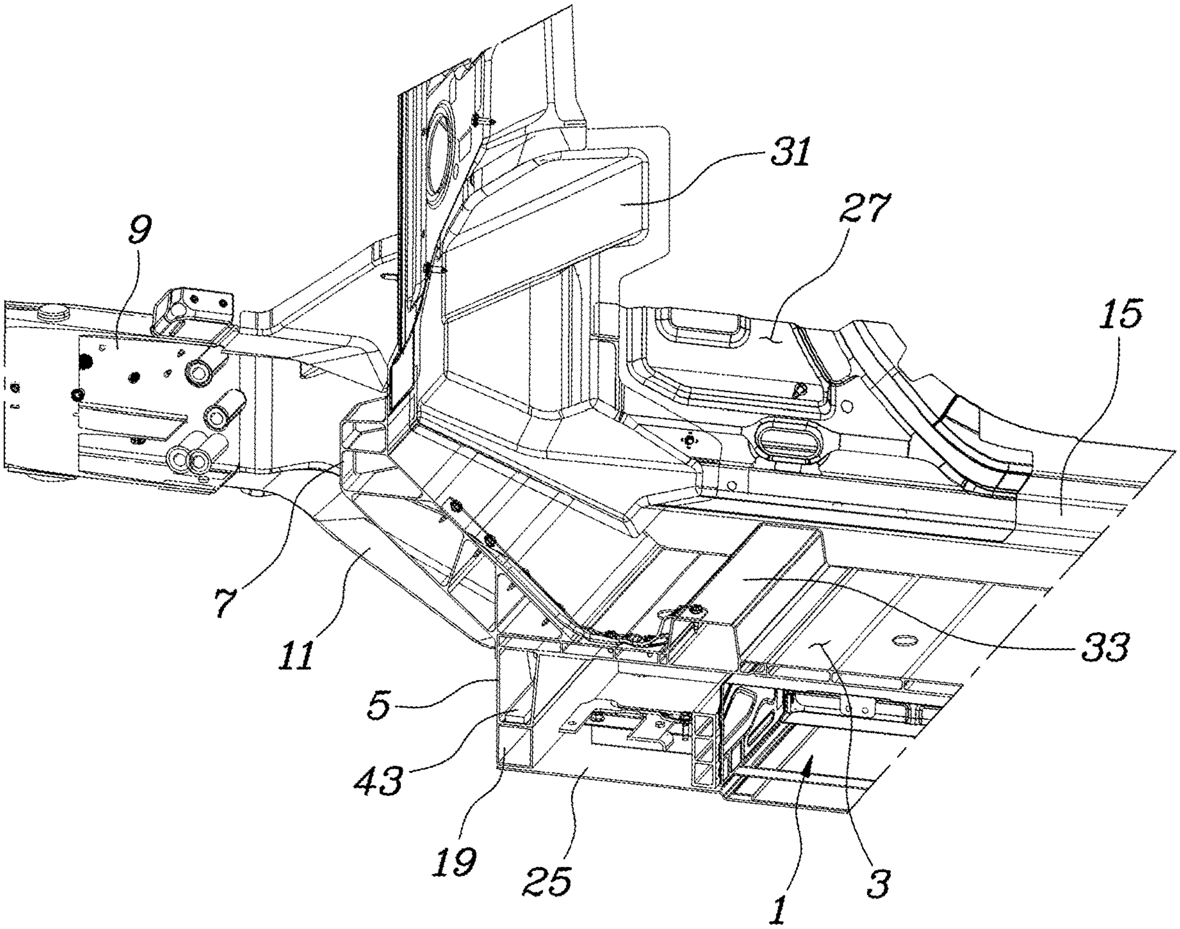
FIG. 7 is a cross-sectional diagram taken along line VII-VII in FIG. 1.
Figure 8:
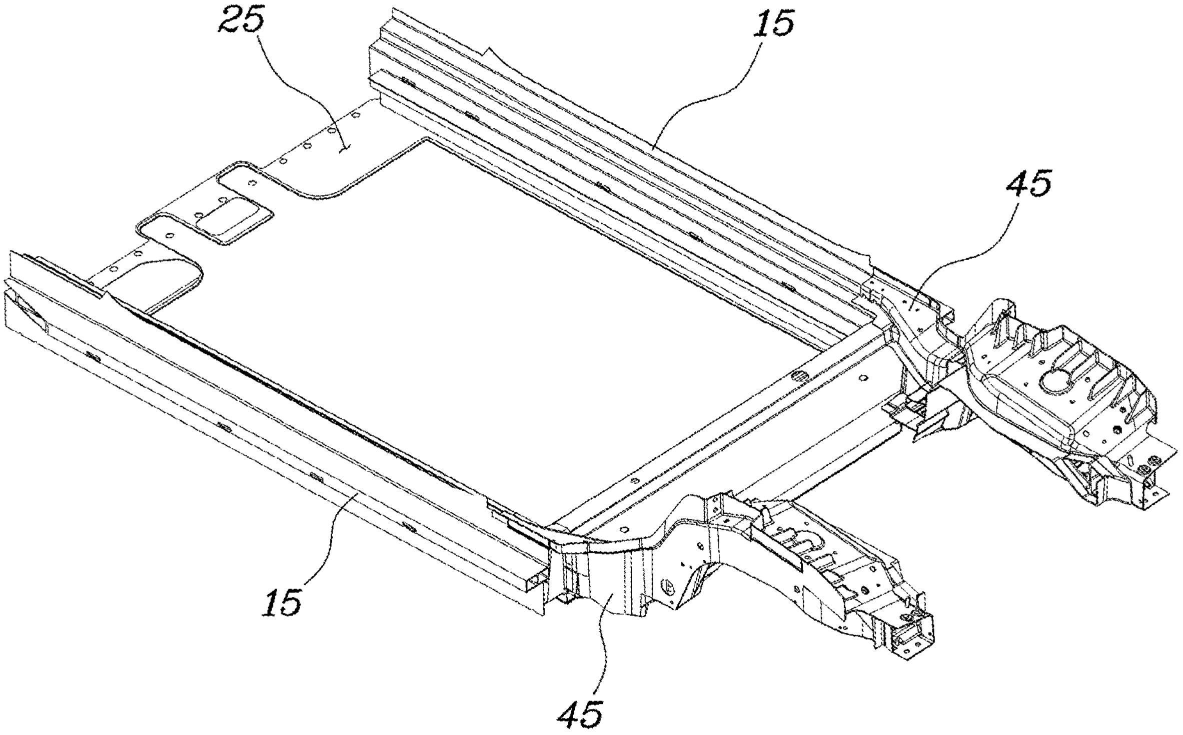
FIG. 8 is a diagram showing main components of a rear side of the vehicle body in FIG. 1.
Figure 9:
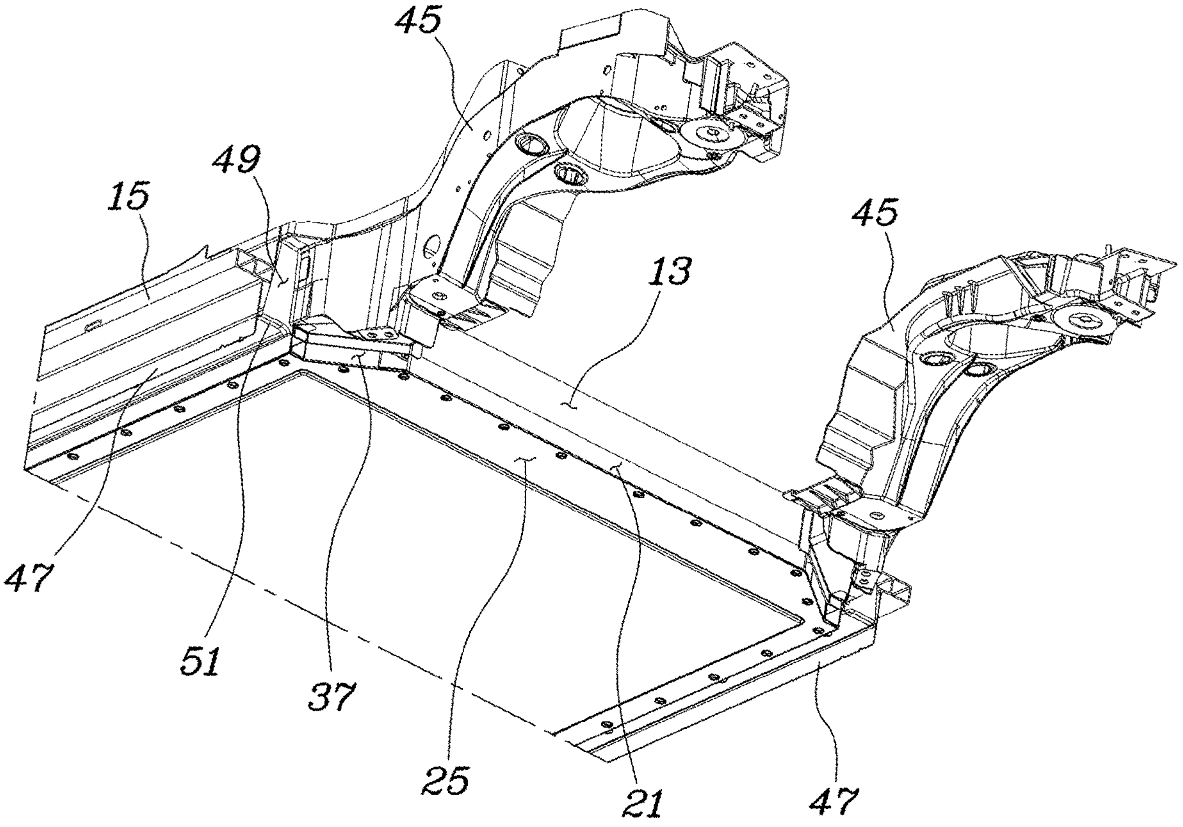
FIG. 9 is a detailed diagram in which the main part of FIG. 8 is observed from a lower side.
Figure 10:
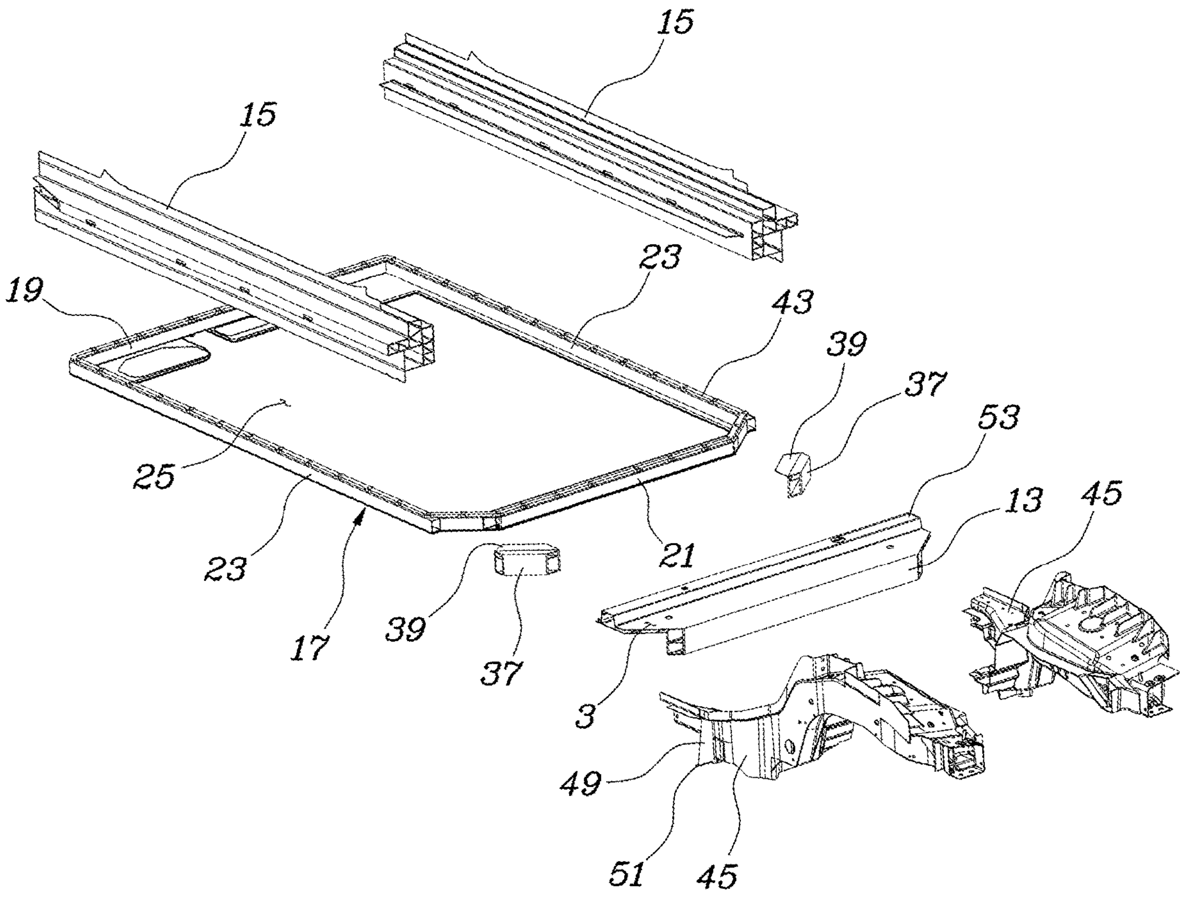
FIG. 10 is a diagram illustrated by disassembling a main component of a rear side of the vehicle body in FIG. 1.
Figure 11:
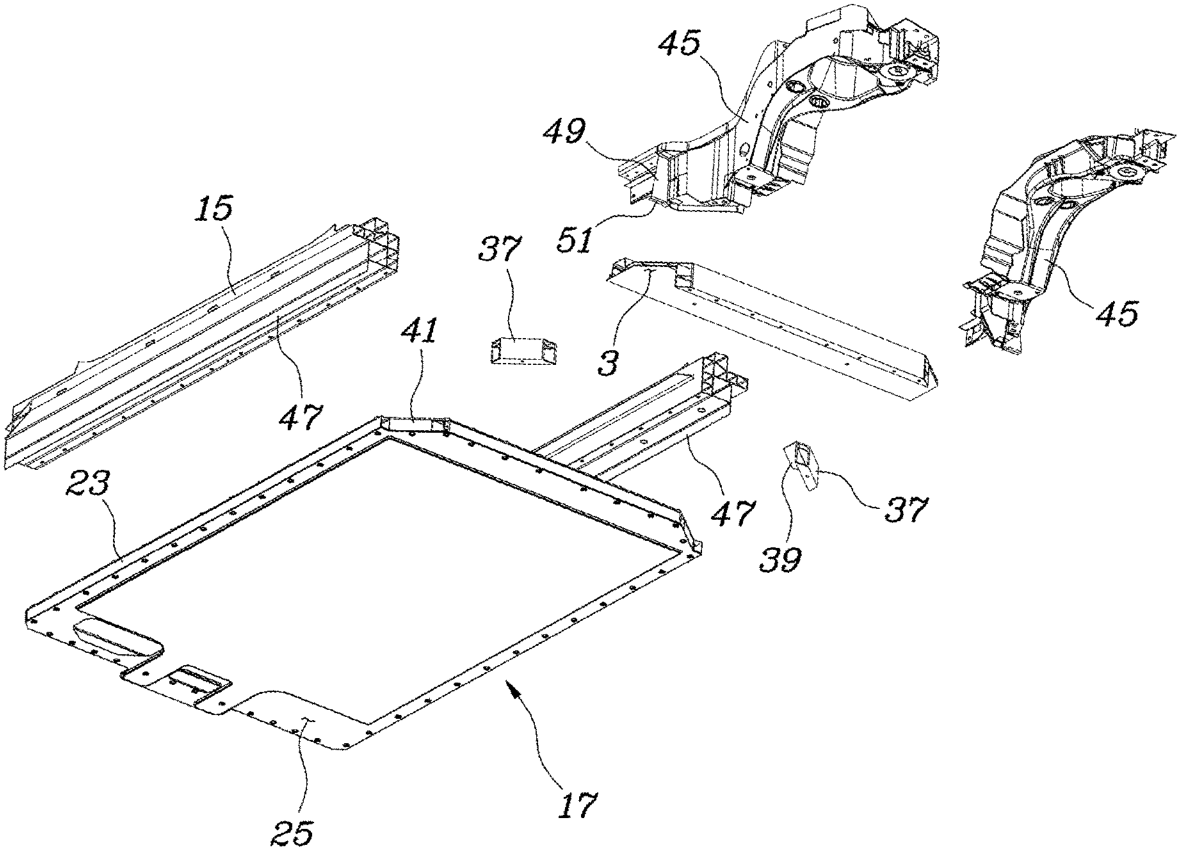
FIG. 11 is a diagram observed from a lower side of FIG. 10.
Figure 12:
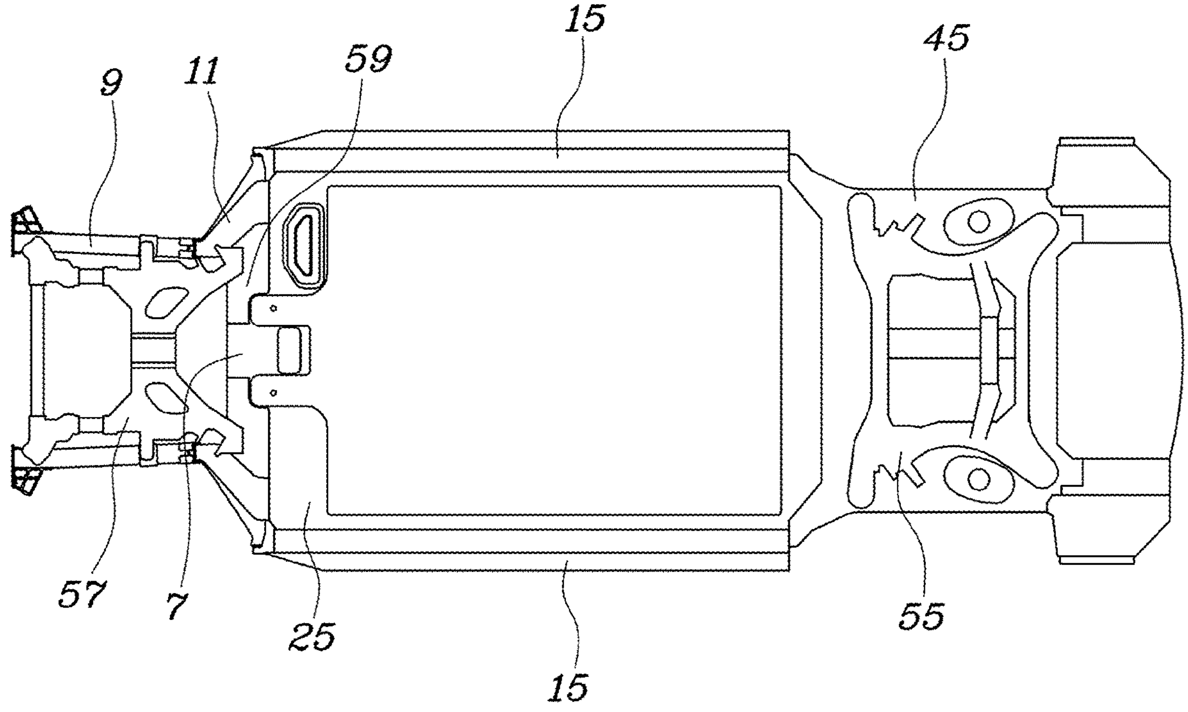
FIG. 12 is a bottom view of the vehicle body of FIG. 1.

Referring to FIGS. 1-12, in an electric vehicle body structure of embodiments of the present disclosure, the vehicle body structure includes a floor panel 3 installed in order to cover an upper side of a battery accommodation space 1, an integrated battery front cross member 5 provided on a front lower side of the floor panel 3 and covering a front of the battery accommodation space 1, a dash cross member 7 coupled to the floor panel 3 and the integrated battery front cross member 5, a front side member 9 provided in a front of the dash cross member 7, and a front side rear lower member 11 connecting a rear of the front side member 9 to the dash cross member 7.

In other words, an electric vehicle body structure of embodiments of the present disclosure is configured so that the floor panel 3 plays a role as a case covering an upper side of the battery accommodation space 1 accommodating battery cells. The front side member 9 is also connected to the dash cross member 7 through the front side rear lower member 11. The dash cross member 7 also supports effectively a shock input from a front to a rear through the front side member 9 by being supported by the floor panel 3 and the integrated battery front cross member 5. Thus, the electric vehicle body structure is configured to safely protect battery cells in the battery accommodation space 1.

In addition, the electric vehicle body structure of embodiments of the present disclosure configures an integrated battery rear cross member 13 provided on a rear lower side of the floor panel 3 and covering a rear of the battery accommodation space 1, a side sill 15 coupled to both ends of the integrated battery front cross member 5 and the integrated battery rear cross member 13 and covering a side portion of the battery accommodation space 1, and a battery lower module 17 coupled to a lower side of the integrated battery front cross member 5, the integrated battery rear cross member 13, and the side sill 15 and covering a lower portion of the battery accommodation space 1.

Herein, the battery lower module 17 includes a lower module outer front cross member 19 coupled to a lower side of the integrated battery front cross member 5, a lower module outer rear cross member 21 coupled to a lower side of the integrated battery rear cross member 13, a lower module outer side member 23 coupled to a lower side of the side sill 15, and a lower plate 25 coupled to a lower side of the lower module outer front cross member 19, the lower module outer rear cross member 21, and the lower module outer side member 23 and covering a lower portion of the battery accommodation space 1.

In other words, the battery accommodation space 1 is configured to include an upper side of the battery accommodation space 1 covered by the floor panel 3, a lower side of the battery accommodation space 1 covered by the lower plate 25, a front of the battery accommodation space 1 covered by the integrated battery front cross member 5 and the lower module outer front cross member 19, both sides of the battery accommodation space 1 covered by the side sill 15 and the lower module outer side member 23, and a rear of the battery accommodation space covered by the integrated battery rear cross member 13 and the lower module outer rear cross member 21.

The dash cross member 7 is coupled to both an upper side of the floor panel 3 and a front surface of the integrated battery front cross member 5.

In other words, the dash cross member 7 is coupled into a shape surrounding a frontal upper side edge formed by the floor panel 3 and the integrated battery front cross member 5. Thus, a load transmitted rearward through the dash cross member 7 may be distributed and supported by the floor panel 3 and the integrated battery front cross member 5.

The front side rear lower member 11 is coupled to vertically surround a front surface of the dash cross member 7 and is coupled to a front surface of the integrated battery front cross member 5.

Accordingly, a load transmitted rearward through the front side member 9 is transmitted to the dash cross member 7 and is also distributed and transmitted to the integrated battery front cross member 5.

Moreover, the electric vehicle body structure of embodiments of the present disclosure includes an extension side member 29 connecting a rear of the front side member 9 to an A-pillar 27 including a lower end coupled to the side sill 15 by being coupled with the front side rear lower member 11.

In other words, an extension side member 29 connects a rear of the front side member 9 to the A-pillar 27 by forming a closed cross-section with the front side rear lower member 11 so as to be supported.

For reference, in the present drawings, an upper side portion of the A-pillar 27 is omitted and only a lower side portion of the A-pillar 27 is shown.

The electric vehicle body structure of embodiments of the present disclosure also includes a dash cross extension member 31 installed in order to connect the dash cross member 7 to the side sill 15 and the A-pillar 27.

In other words, the dash cross extension member 31 not only increases a coupling force of the dash cross member 7 and the side sill 15, but it also plays a role to more firmly connect a lower portion of the A-pillar 27 to the side sill 15 by being installed as if extending both ends of the dash cross member 7 and by being coupled to the A-pillar 27 and the side sill 15.

The electric vehicle body structure of embodiments of the present disclosure also includes the floor panel 3, wherein there is provided a floor front cross member 33 disposed to protrude upward in order to connect both side sills 15, and there is also provided a dash floor connection member 35 connecting and supporting an interval of the dash cross member 7 and the floor front cross member 33 along a front-to-back direction of a vehicle body.

Accordingly, the dash cross member 7 may protect more effectively batteries in the battery accommodation space 1 from a front collision of a vehicle and so forth, by being connected and supported in a front-to-back direction by the floor front cross member 33 and the dash floor connection member 35 in a rear and by distributing and supporting a load input from the front side member 9 to the dash floor connection member 35 and the floor front cross member 33.

Between the integrated battery rear cross member 13 and the side sill 15, there may be provided a corner reinforcement member 37 obliquely coupled to the integrated battery rear cross member 13 and the side sill 15.

In other words, the integrated battery rear cross member 13 may configure the battery accommodation space 1 by being directly coupled to the side sill 15. However, by further increasing a volume of the battery accommodation space 1, in a case that a rear of the battery accommodation space 1 is extended in order to increase accommodated battery cells, as described above, an interval of the integrated battery rear cross member 13 and the side sill 15 may be configured to be connected with the corner reinforcement member 37.

There may be integrally provided a coupling flange 39 protruding toward the battery accommodation space 1 on an upper side of the corner reinforcement member 37 and coupled to a lower side surface of the floor panel 3.

When the coupling flange 39 is welded at the floor panel 3 in a method such as friction stir welding (FSW), it provides facile weldability.

The battery lower module 17 includes a lower module outer corner member 41 coupled obliquely to the lower module outer rear cross member 21 and the lower module outer side member 23 on a lower side of the corner reinforcement member 37 between the lower module outer rear cross member 21 and the lower module outer side member 23.

In other words, as described above, in a case that the corner reinforcement member 37 is provided, the battery lower module 17 is also provided with the lower module outer corner member 41 in order to be coupled to a lower side of the corner reinforcement member 37. Thus, the battery accommodation space 1 may be completely sealed.

The lower module outer front cross member 19, the lower module outer rear cross member 21, the lower module outer side member 23, and the lower module outer corner member 41 are coupled vertically with the integrated battery front cross member 5, the integrated battery rear cross member 13, the side sill 15, and the corner reinforcement member 37 with the gasket 43 forming a closed curve in between. Thus, the battery accommodation space 1 is configured to be sealed.

For reference, the gasket 43 is compressed by being inserted between members, as described above. However, the gasket 43 is shown in a protruded state into members relatively located on an upper side in drawings, such as the integrated battery front cross member 5, the integrated battery rear cross member 13, the side sill 15, and the corner reinforcement member 37.

A rear side member 45 is coupled to a rear end of the side sill 15. A front end of the rear side member 45 is also formed into a shape surrounding an upper side surface, a lower side surface, and a rear end of the side sill 15.

The side sill 15 is configured with a side sill lower rib 47 forming an opened groove downward together with the lower module outer side member 23.

Moreover, the rear side member 45 is provided with a rear side partition wall portion 49 extending from an upper side to a lower side in order to surround a rear end of the side sill 15 and a partition wall flange portion 51 surrounding a lower side of the side sill 15 by being inserted into a groove formed by the side sill lower rib 47 and the lower module outer side member 23 at a lower end of the rear side partition wall portion 49.

Accordingly, the side sill 15 and the rear side member 45 have a strong coupling structure not only in a front-to-back direction but also in an up-down and left-right direction.

The rear side member 45 is coupled with the side sill 15 in order to support a rear of the corner reinforcement member 37.

Accordingly, a load input from a rear through the rear side member 45 is distributed into the corner reinforcement member 37 and the side sill 15. Thus, the load is supported.

Moreover, the floor panel 3 is provided with a floor rear cross member 53 disposed to protrude upward in order to connect both of the side sills 15. The rear side member 45 is also coupled to the floor rear cross member 53.

In other words, the rear side member 45 forms a more robust coupling structure with the above components by being coupled to the side sill 15, the corner reinforcement member 37, and the floor rear cross member 53.

In addition, a rear subframe 55 is mounted on a lower side of the rear side member 45. A rear wheel and so forth are mounted on the rear subframe 55.

The floor panel 3 including a cross-sectional shape with a plurality of closed cross-sections is formed, while the above cross-sectional shape extends along a transverse direction of the vehicle body, and the integrated battery front cross member 5 and the integrated battery rear cross member 13 are also integrally formed with the floor panel 3 into a cross section protruding to a lower side of the floor panel 3.

In other words, in embodiments of the present disclosure, a plurality of the floor panels 3 is disposed in a front-to-back direction in order to planarly surround an upper side of the battery accommodation space 1. As described above, the frontmost floor panel 3 is also integrally formed with the integrated battery front cross member 5. The rearmost floor panel 3 is also integrally formed with the integrated battery rear cross member 13.

Therefore, there is an advantage that it is not necessary to join the floor panel 3, the integrated battery front cross member 5, and the integrated battery rear cross member 13 by welding or the like.

Namely, if an assembly work of jointing the floor panel 3 and the side sill 15 and jointing the floor panel 3 and the corner reinforcement member 37 is executed in FSW, a considerable time of assembling may be required. However, in this case, as described above, a special joining work, such as FSW, is not required for the floor panel 3, the integrated battery front cross member 5, and the integrated battery rear cross member 13. Thus, this part of embodiments of the present disclosure helps improve vehicle assembly productivity.

In addition, in the vehicle body structure of embodiments the present disclosure, there is integrally formed the floor front cross member 33 protruding upward so that the floor panel 3 provided with the integrated battery front cross member 5 connects both of the side sills 15. The floor panel 3 provided with the integrated battery rear cross member 13 is also configured so that the floor rear cross member 53 protruding upward is integrally formed in order to connect both of the side sills 15. Thus, the vehicle body structure of embodiments of the present disclosure minimizes unnecessary assembly work and also provides a more robust vehicle body structure than ever, increasing a torsional rigidity of a vehicle body and so forth.

Meanwhile, a front subframe 57 is mounted on a lower side of the front side member 9. A rear end of the front subframe 57 is also supported by a front subframe mounting bracket 59 on a lower side of the dash cross member 7.

The front subframe 57 may be supported as a driving component, such as a front wheel, a motor, and so forth.

Embodiments of the present disclosure have been shown and described with respect to specific embodiments. However, within a scope without departing from a technical spirit of the present disclosure provided by a scope of the following claims, it will be apparent to those skilled in the art that the present disclosure may be improved and changed in various ways.

What is claimed is:

1. A body structure for a vehicle, the body structure comprising:

a floor panel covering an upper side of a battery accommodation space;

an integrated battery front cross member disposed on a front lower side of the floor panel and covering a front of the battery accommodation space;

a dash cross member coupled to the floor panel and the integrated battery front cross member;

a front side member disposed at a front side of the dash cross member; and a front side rear lower member connecting a rear of the front side member to the dash cross member, wherein the front side rear lower member is coupled to vertically surround a front surface portion of the dash cross member and is coupled to a front side of the integrated battery front cross member.

2. The body structure of claim 1, further comprising:

an integrated battery rear cross member disposed on a rear lower side of the floor panel and covering a rear of the battery accommodation space;

side sills coupled to both ends of the integrated battery front cross member and the integrated battery rear cross member and covering a side portion of the battery accommodation space; and a battery lower module coupled to a lower side of the integrated battery front cross member, the integrated battery rear cross member, and the side sills and covering a lower portion of the battery accommodation space.

3. The body structure of claim 2, wherein the battery lower module comprises:

a lower module outer front cross member coupled to the lower side of the integrated battery front cross member;

a lower module outer rear cross member coupled to a lower side of the integrated battery rear cross member;

lower module outer side members coupled to a lower side of the side sills; and a lower plate coupled to each lower side of the lower module outer front cross member, the lower module outer rear cross member, and the lower module outer side member so as to cover the lower portion of the battery accommodation space.

4. The body structure of claim 2, wherein the dash cross member is coupled to both an upper side of the floor panel and the front side of the integrated battery front cross member.

5. The body structure of claim 2, further comprising an extension side member coupled to the front side rear lower member and connecting the rear of the front side member to an A-pillar including a lower end coupled to a respective one of the side sills.

6. The body structure of claim 5, further comprising a dash cross extension member connecting the dash cross member, the side sill, and the A-pillar.

7. The body structure of claim 2, wherein the floor panel comprises:

a floor front cross member disposed to protrude upward to connect both of the side sills; and a dash floor connection member connecting and supporting an interval of the dash cross member and the floor front cross member along a front-to-back direction of the body structure.

8. The body structure of claim 1, further comprising a front subframe mounted on a lower side of the front side member, wherein a rear end of the front subframe is supported by a front subframe mounting bracket on a lower side of the dash cross member.

9. A body structure for an electric vehicle, the body structure comprising:

a floor panel covering an upper side of a battery accommodation space;

an integrated battery front cross member disposed on a front lower side of the floor panel and covering a front of the battery accommodation space;

a dash cross member coupled to the floor panel and the integrated battery front cross member;

a front side member disposed at a front side of the dash cross member;

a front side rear lower member connecting a rear of the front side member to the dash cross member;

an integrated battery rear cross member disposed on a rear lower side of the floor panel and covering a rear of the battery accommodation space;

side sills coupled to both ends of the integrated battery front cross member and the integrated battery rear cross member and covering a side portion of the battery accommodation space;

corner reinforcement members obliquely coupled to the integrated battery rear cross member and the side sills and disposed between the integrated battery rear cross member and the side sills; and a battery lower module coupled to a lower side of the integrated battery front cross member, the integrated battery rear cross member, and the side sills and covering a lower portion of the battery accommodation space, wherein the battery lower module comprises:

a lower module outer front cross member coupled to the lower side of the integrated battery front cross member;

a lower module outer rear cross member coupled to the lower side of the integrated battery rear cross member;

lower module outer side members coupled to a lower side of the side sills; and a lower plate coupled to each lower side of the lower module outer front cross member, the lower module outer rear cross member, and the lower module outer side member so as to cover the lower portion of the battery accommodation space.

10. The body structure of claim 9, wherein each of the corner reinforcement members comprises a coupling flange integrally formed and protruding towards the battery accommodation space and configured to couple with a lower surface of the floor panel.

11. The body structure of claim 9, wherein the battery lower module comprises a lower module outer corner member obliquely coupled to the lower module outer rear cross member and the lower module outer side member on a lower side of a respective one of the corner reinforcement members between the lower module outer rear cross member and the lower module outer side member.

12. The body structure of claim 11, wherein the lower module outer front cross member, the lower module outer rear cross member, the lower module outer side member, and the lower module outer corner member are coupled to the integrated battery front cross member, the integrated battery rear cross member, the side sills, and the corner reinforcement members with a gasket defining a closed curve in between so as to seal the battery accommodation space.

13. The body structure of claim 9, further comprising a rear side member coupled to a rear end of a respective one of the side sills, wherein a front end of the rear side member has a shape surrounding an upper side surface, a lower side surface, and a rear end of the side sill.

14. The body structure of claim 13, wherein:

the side sill comprises a side sill lower rib defining an opened groove downward together with the lower module outer side member;

the rear side member comprises a rear side partition wall portion extending from an upper side to a lower side to surround the rear end of the side sill; and the rear side member comprises a partition wall flange portion surrounding the lower side of the side sill in a state of being inserted into a groove defined by the side sill lower rib and the lower module outer side member at a lower end of the rear side partition wall portion.

15. The body structure of claim 13, wherein the rear side members are coupled to support a rear of the corner reinforcement members and the side sills.

16. The body structure of claim 13, wherein:

the floor panel comprises a floor rear cross member protruding upward and connecting both of the side sills; and the rear side member is coupled to the floor rear cross member.

17. The body structure of claim 13, further comprising a rear subframe mounted on a lower side of the rear side member.

18. A body structure for a vehicle, the body structure comprising:

a floor panel covering an upper side of a battery accommodation space, wherein the floor panel has a first cross-sectional shape with a plurality of first closed cross-sections, the first cross-sectional shape extending along a transverse direction of the body structure;

an integrated battery front cross member disposed on a front lower side of the floor panel and covering a front of the battery accommodation space;

a dash cross member coupled to the floor panel and the integrated battery front cross member;

a front side member disposed at a front side of the dash cross member;

a front side rear lower member connecting a rear of the front side member to the dash cross member;

an integrated battery rear cross member disposed on a rear lower side of the floor panel and covering a rear of the battery accommodation space, wherein the integrated battery front cross member and the integrated battery rear cross member are integrally formed with the floor panel into cross sections respectively protruding from a lower side of the floor panel;

side sills coupled to both ends of the integrated battery front cross member and the integrated battery rear cross member and respectively covering side portions of the battery accommodation space; and a battery lower module coupled to a lower side of the integrated battery front cross member, the integrated battery rear cross member, and the side sills and covering a lower portion of the battery accommodation space, wherein the dash cross member comprises a second cross-sectional shape including a plurality of second closed cross-sections connected to each other and extending from the floor panel toward a front-upward direction of the body structure.

19. The body structure of claim 18, wherein:

a plurality of the floor panels are disposed in a front-to-back direction and planarly surround the upper side of the battery accommodation space;

a first floor panel of the plurality of the floor panels disposed with the integrated battery front cross member is integrally formed with a floor front cross member protruding upward and connecting both of the side sills; and a second floor panel of the plurality of the floor panels disposed with the integrated battery rear cross member is integrally formed with a floor rear cross member protruding upward and connecting both of the side sills.

20. The body structure of claim 1, wherein the dash cross member comprises a cross-sectional shape including a plurality of closed cross-sections connected to each other.

* * * * *